(12) United States Patent
Wu (10) Patent No.: US 6,963,608 B1
(45) Date of Patent: Nov. 8, 2005

(54) METHOD AND APPARATUS FOR PROVIDING RATE CONTROL IN A VIDEO ENCODER

(75) Inventor: Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/806,626

(22) PCT Filed: Sep. 29, 1999

(86) PCT No.: PCT/US99/22663

§ 371 (c)(1),
(2), (4) Date: Apr. 2, 2001

(87) PCT Pub. No.: WO00/21302

PCT Pub. Date: Apr. 13, 2000

Related U.S. Application Data (60) Provisional application No. 60/102,800, filed on Oct. 2, 1998.

(51) Int. Cl.[7] .............................. H04N 7/12; H04B 1/66
(52) U.S. Cl. ............................................... 375/240.03
(58) Field of Search ...................... 375/240.01, 240.02, 375/240.03, 240.05, 240.11, 240.18, 240.25; 348/386.1; 725/101; 382/232, 234, 240, 382/236; H04B 1/66; H04N 7/12

(56) References Cited

U.S. PATENT DOCUMENTS

| | | | |
|---|---|---|---|
| 5,489,943 A * | 2/1996 | Kutner ................... | 375/240.18 |
| 5,550,590 A * | 8/1996 | Sakazawa et al. ....... | 348/386.1 |
| 5,623,312 A | 4/1997 | Yan et al. | |
| 5,650,860 A | 7/1997 | Uz | |
| 5,694,170 A | 12/1997 | Tiwari et al. | |
| 5,701,160 A | 12/1997 | Kimura et al. | |
| 5,719,986 A | 2/1998 | Kato et al. | |
| 5,731,837 A * | 3/1998 | Hurst, Jr. ............... | 375/240.03 |
| 5,793,425 A * | 8/1998 | Balakrishnan ......... | 375/240.25 |
| 5,815,209 A * | 9/1998 | Kondo et al. .......... | 375/240.18 |

(Continued)

OTHER PUBLICATIONS

G. Keesman, et al., "Bit-rate control for MPEG encoders," Signal Processing: IMAGE Communication, vol. 6, pp. 545-560, 1995.

(Continued)

*Primary Examiner*—Tung Vo
(74) *Attorney, Agent, or Firm*—Robert P. Marley

(57) ABSTRACT

A method and apparatus are provided for controlling the quantization level in a digital video encoder that comprises a plurality of parallel compression engines (12). The input picture is partitioned into a number of panels (10) and each panel is processed by a distinct compression engine (12). A reference quantizer scale is determined before encoding a frame of video. The reference quantizer scale is used at the first slice of every video image panel being processed by the video encoder. The quantizer scale at the last slice of the image panel is then forced to be the same as the first slice. The forcing step can use a piecewise-linear feedback formula. A group of pictures (GOP) target bit rate is adjusted based on the number of film pictures and non-film pictures currently in the processing pipeline of at least one of the compression engines. A higher target bit rate is provided for non-film pictures. A buffer (16) level of the video encoder is used to control the start of a new group of pictures (GOP). The start of a new GOP is delayed if the buffer (16) does not have sufficient space to accommodate an intra-coded (I) frame for the new GOP.

33 Claims, 1 Drawing Sheet

U.S. PATENT DOCUMENTS

| | | | | |
|---|---|---|---|---|
| 5,946,039 | A | * | 8/1999 | Ben-Arie et al. ......... 348/403.1 |
| 5,949,490 | A | * | 9/1999 | Borgwardt et al. ..... 375/240.05 |
| 5,986,712 | A | * | 11/1999 | Peterson et al. ....... 375/240.14 |
| 6,072,831 | A | | 6/2000 | Chen |
| 6,115,421 | A | * | 9/2000 | Katta et al. .................. 375/240 |
| 6,151,362 | A | | 11/2000 | Wang |
| 6,233,735 | B1 | * | 5/2001 | Ebihara ....................... 725/101 |
| 6,731,685 | B1 | * | 5/2004 | Liu et al. ................ 375/240.14 |

OTHER PUBLICATIONS

D. Bagni, et al., "Efficient Intra-frame Encoding and improved Rate Control in H.263 compatible format," NTG Fachberichte, pp. 767-774 XP002095679 ISSN: 0341-0196, Sep. 10, 1997.

Björk, Niklas et al., "Transcoder Architectures For Video Coding," IEEE Transactions on Consumer Electronics, vol. 44, No. 1, Feb. 1998, pp. 88-98.

Staff of Cable Television Laboratories Inc., "Digital TV Solutions," From the Labs: Cable World, Feb. 1, 1999.

Advanced Television Systems Committee Standard A/53, "ATSC Digital Television Standard", Sep. 16, 1995.

ISO/IEC 13818-2, "Generic Coding of Moving Pictures and Associated Audio: Video", (MPEG2 Standard) 1995 E.

Test Model 5, ISO/IEC JTC1/SC29/WG11, Document AVC-491, Apr. 1993.

Advanced Television Systems Committee Standard A/54, "Guide to the Use of the ATSC Digital Television Standard", Oct. 4, 1995.

* cited by examiner

FIG. 1

METHOD AND APPARATUS FOR PROVIDING RATE CONTROL IN A VIDEO ENCODER

This application claims priority from U.S. provisional application No. 60/102,800 filed Oct. 2, 1998.

BACKGROUND OF THE INVENTION

The present invention relates to video processing, and more particularly to a method and apparatus for controlling the rate of data production by multiple encoding engines provided to compress video in a television encoder, such as a digital high definition television (HDTV) or standard definition television (SDTV) encoder.

The following references are relevant to this disclosure:
1. Advanced Television Systems Committee (ATSC) A53 Standard entitled "ATSC Digital Television Standard."
2. ATSC A54 Standard entitled "Guide to the use of ATSC Digital Television Standard."
3. ISO/IEC 13818-2 "Generic Coding of Moving Pictures and Associated Audio: Video" (MPEG2).
4. ISO/IEC JTC1/SC29/WG11/MPEG93/457 "MPEG2 Test Model 5."
5. "Rate Control for the Grand Alliance Prototype Encoder," Siu-Wai Wu, memo distributed to the Grand Alliance Video Compression Specialist Group, November 1994.

Rate control is an essential part of a video encoder. In an HDTV encoder, the picture is processed using multiple encoding engines for data compression. These multiple encoding engines operate on the picture simultaneously, but share a common data buffer. Thus, the rate at which data is produced by the multiple engines must be carefully regulated in order to prevent buffer overflow, buffer underflow, and other problematic conditions.

In the past, rate control algorithms have been proposed for use in conjunction with a single video compressor. See, e.g., "MPEG2 Test Model 5" referred to above. In the approach adopted by the Grand Alliance for encoding HDTV, the parallel encoding engines are synchronized at the video slice instead of frame level; thus, the rate control can be treated as if only a single compressor were provided. None of the prior art schemes provide a robust solution to the problem of regulating the rate of data production by a plurality of compressors, in order to control the quantization of a digital video encoder that uses parallel compression engines.

It would be advantageous to provide an efficient rate control algorithm to regulate the rate of data production by multiple encoding engines to optimize video quality. It would be further advantageous to implement such an algorithm in the video encoder's existing controller microprocessor. The present invention provides a method and apparatus enjoying these and other advantages.

SUMMARY OF THE INVENTION

In accordance with the present invention, rate control is provided in a video encoder having multiple compression engines that process a picture simultaneously and share a common buffer. Nonlinear feedback is used to force a quantizer scale at the last slice of an image panel to be approximately the same as the quantizer scale at the first slice of the image panel. This avoids visible artifacts caused by abrupt changes in the quantizer scale at the panel boundaries.

A target bit rate for a group of pictures (GOP) is adjusted based on the number of film pictures and non-film pictures currently in the processing pipeline of the compression engines. Since non-film processing in general requires a higher target bit rate, this adjustment allows the rate control algorithm to adapt when the video switches from film to non-film or vice versa.

The buffer level is used to control the start of a new GOP. If there is not sufficient space in the buffer to accommodate the intra-coded (I) frame, the start of a new GOP is delayed.

More particularly, methods and apparatus are provided for controlling the quantization in a digital video encoder that comprises a plurality of parallel compression engines. A target quantization level is determined for a video frame. The target quantization level is applied to the first slice of every video image panel of a plurality of panels representing the video frame and being processed in parallel by the video encoder. The quantization level is driven toward the target quantization level at the last slice of each of the image panels.

The driving step can use, for example, piecewise linear feedback to drive the quantization level of the last slice of each of the image panels toward the target quantization level. The feedback can compensate for variations in the quantization level between the first and last slice of each image panel.

A group of pictures (GOP) target bit rate can be adjusted based on a number of film pictures and non-film pictures currently in a processing pipeline of at least one of the compression engines. A higher target bit rate can be provided for non-film pictures.

A buffer level of the video encoder can be used to control the start of a new group of pictures (GOP). The start of a new GOP is delayed if there is not sufficient space in the buffer to accommodate an intra-coded (I) frame for the new GOP.

Every input picture can be partitioned into a fixed number of horizontal panels, wherein each of the panels is compressed by a separate compression engine. The panels can be simultaneously compressed during a frame time. The compressed panel data are stored locally at the compression engines for subsequent transfer to a video buffer of the video encoder within a next frame time. In order to form a transport packet, data are retrieved from the buffer at an average rate equal to a specified video bit rate whenever the buffer has at least one transport packet payload's worth of data. Null packets are substituted for video packets to maintain a constant transport bit rate whenever the buffer level falls below one transport packet payload's worth of data.

A reference quantizer scale is calculated for each of the compression engines. The reference quantizer scale is calculated based on an accumulation of quantizer scale values for the compression engine (PanelSumQuant), an accumulation of the number of bits generated on that compression engine (PanelBitCount); an accumulation of the number of macroblocks processed on that compression engine (PanelMbCount); and a fullness level of a video buffer of the video encoder (VideoBufferLevel). The compression engine modifies its reference quantizer scale based on a local buffer fullness to generate a final quantizer scale value for use in quantization. A panic mode can be initiated by the compression engine if the final quantizer scale value is higher than a predetermined maximum value. The panic mode forces all or part of the DCT coefficient to take on a zero value.

A method is also provided for controlling the rate at which data is processed by a digital video encoder using a plurality of parallel compression engines to compress successive macroblocks of video data. Frame level rate control is provided for successive video frames in accordance with a picture start interrupt service routine once per coded picture. Macroblock level rate control is provided in accordance with a rate control interrupt service routine a plurality of times per coded picture.

The picture start interrupt routine updates frame level statistical variables by processing data collected from a prior coded frame. A target bit rate is calculated for a new group of pictures (GOP) if a new frame to be processed comprises an intra-coded (I) frame. For every frame to be encoded, upper and lower limits are calculated for the number of bits that a new frame is allowed to generate. A target number of bits is computed for each frame and for each of a plurality of panels into which each frame is divided. The target number of bits can be computed by distributing the bits in proportion to relative complexity values of the video frames being processed. A frame target quantizer scale is calculated from the target number of bits computed for a frame. The frame target quantizer scale is provided to each of the plurality of compression engines as an initial reference quantizer scale for use in commencing coding of the video frame.

In a preferred embodiment, the compression engines can force some of the Discrete Cosine Transform (DCT) coefficients of the video frame macroblocks to zero, if the reference quantizer scale is too high to maintain the number of bits that the new frame is allowed to generate within the applicable upper limit.

The rate control interrupt service routine provides interrupts which initiate a modulation of a frame target quantizer scale. The modulation can be based on feedback to attempt to bring the actual number of bits for each of the video frame panels to the corresponding target number of bits for the panel.

DETAILED DESCRIPTION OF THE INVENTION

Figure 1:
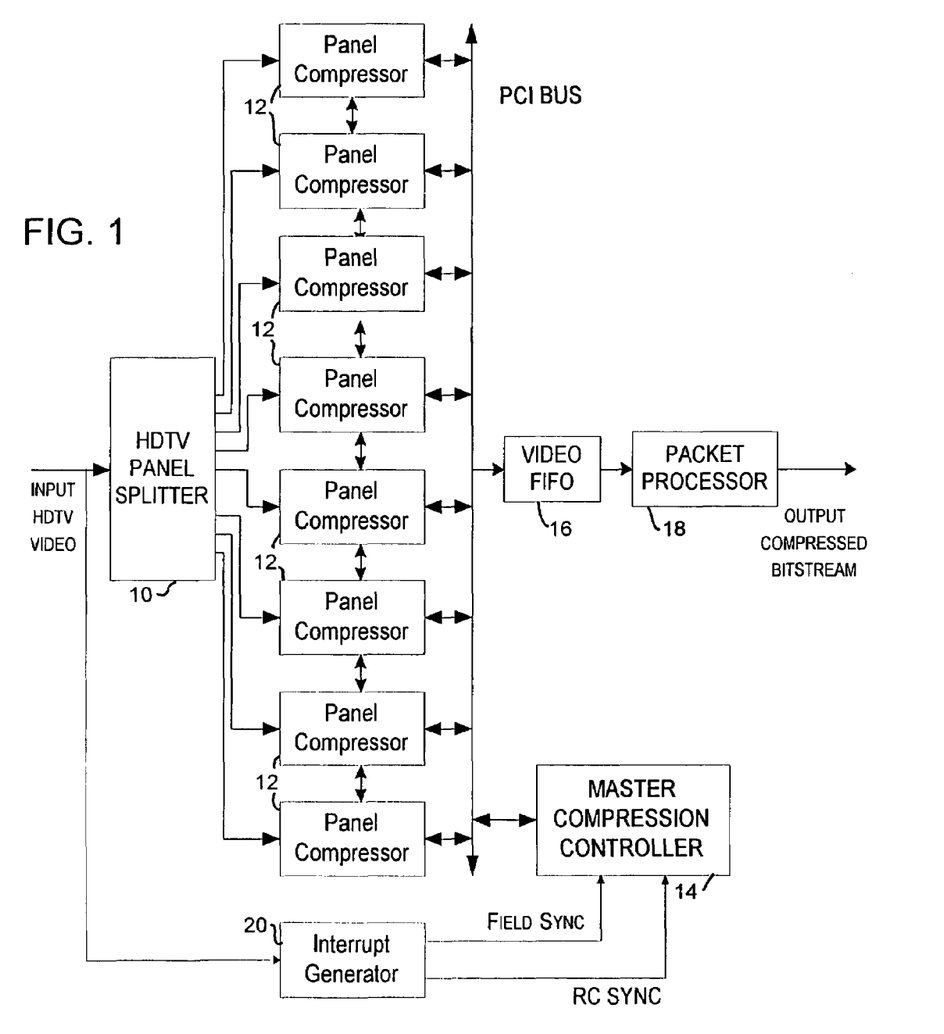
FIG. 1 is a block diagram illustrating an HDTV encoder with which the present invention may be utilized.

The present invention provides a method and apparatus for rate control in a digital video encoder that uses multiple compression engines running in parallel. In accordance with a preferred embodiment of the invention as illustrated in FIG. 1, every input picture is partitioned into eight horizontal panels by an HDTV panel splitter 10. Each panel is then compressed by an individual video panel compressor 12, for example, the DvXpert chip available from C-Cube Microsystems of 1778 McCarthy Blvd., Milpitas, Calif. 95035, USA. It should be appreciated that a different number of panels can be utilized, and that the invention can be implemented on video encoders other than the DvXpert encoder described herein.

The panels into which the input pictures are partitioned are simultaneously compressed during a frame time. The compressed panel data are stored locally on the panel compressor, and then transferred to the primary video FIFO 16 ("video buffer") within the next frame time. Whenever the video FIFO 16 has at least one transport packet payload's worth of data (184 bytes), the bits are retrieved from the FIFO by a packet processor 18 at an average rate equal to the user specified video bit rate (bit_rate). The retrieved bits are used to form a transport packet in accordance with the well known MPEG (Motion Picture Experts Group) standard. Whenever the FIFO level falls below 184 bytes, null packets will be substituted for video packets to maintain a constant transport bit rate, effectively reducing the video bit rate. As illustrated in FIG. 1, packet processor 18 outputs the compressed bitstream.

The rate control function is mainly performed by a master compression controller (MCC) 14. The MCC collects the statistics (PanelSumQuant, PanelBitCount, and PanelMbCount) from the panel compressors and the buffer level from the video FIFO, and then calculates an 8 bit reference quantizer scale (PanelQuant) for each panel compressor. The panel compressor then modifies the reference quantizer scale based on local activities and local buffer fullness to generate the final quantizer scale value to use for quantization. If the desired quantizer scale is higher than the maximum supported by the MPEG quantization table, the panel compressor may apply a panic mode and force some of the DCT (Discrete Cosine Transform) coefficients to zero.

A sync interrupt generator 20, which receives the input HDTV video, generates a field sync interrupt to the MCC at the beginning of every input field, and a Rate-Control (RC) Sync interrupt periodically (e.g., every 1.67 ms for 1080I mode) within a field time. A field sync interrupt is qualified as a picture start if the panel compressors are ready to encode a new picture at the current field time. Rate control by the MCC is performed in two parts: (1) Frame level rate control is carried out at the Picture Start interrupt service routine once per coded picture; (2) Macroblock level rate control is carried out at the RC interrupt service routine up to 20 times per coded picture for 1080 line interlaced (1080I) mode (up to 10 times per coded picture for 720 line progressive scan (720P) mode). On average, only about eight RC interrupts are used to regulate the quantization because the panel compressor only uses a portion of the field time to carry out the encoding process.

The goal of rate control is to maintain a consistent video quality over time and over the picture. A basic assumption of the rate control algorithm is that the coding complexity of a particular picture type is approximately constant from frame to frame of a steady scene, and is measured by the product of the average quantizer scale and the number of bits generated over the frame (or a panel). The complexity of the current frame is normally estimated from that of the previous frame, except a when a scene change or fade-in from black is detected, in which case the complexity estimates are reset to some provisional values.

At picture start interrupt, the MCC first updates all frame level statistical variables by processing the data collected from the last coded frame. A target bit rate for the new GOP is calculated if the upcoming frame is an intra-coded frame (I frame). The GOP target bit rate calculation aims to bring the encoder buffer to a consistently low level at the beginning of every GOP so that there is enough room in the buffer to accommodate the surge of bits produced by the new I frame.

For every frame to be encoded, the MCC calculates the upper and lower limits on the number of bits that the new frame is allowed to generate. These limits are based on the constraint that neither the encoder buffer nor the decoder buffer is allowed to overflow nor underflow. The MCC also computes the target number of bits to be generated for the frame and for each panel by distributing the bits in proportion to the relative complexity values. Then, a frame target quantizer scale is calculated from the target frame bit rate. The frame target quantizer scale is delivered to every one of the multiple panel compressors as the initial reference quantizer scale to start coding the frame.

At each Rate Control Sync interrupt, the MCC modulates the frame target quantizer scale by a feedback mechanism which tries to bring the panel bit count to a value that equals the targets. If the accumulated bit count is approaching the upper limit that is calculated at the picture start, the modulated quantizer scale is further increased to slow down the production of bits. The resulting reference quantizer scale value is then clipped to fit into an eight bit integer value for delivery to every panel compressor.

Upon receiving the reference quantizer scale, the panel compressor checks its local buffer level and increases the reference quantizer scale if needed to protect the buffer. The panel compressor may also force some DCT coefficients to be zero if the reference quantizer scale is too high. Then, adaptive quantization is performed in a manner similar to the MPEG Test Model 5 and the actual quantization scale is looked up from the Moving Picture Experts Group (MPEG) quantization scale table.

The following sections detail the operation of the rate control algorithm.

1. List of variables

| Name | Default Value | Description |
|---|---|---|
| BitRate | User define | Elementary video bit rate (bits per second) |
| N | User define | Nominal GOP Length |
| M | User define | Temporal distance between consecutive I or P frames |
| Nb | N/A | Nominal number of B frames in a GOP |
| Np | N/A | Nominal number of P frames in a GOP |
| FrameRate | User define | Frame rate of the input video |
| PanelSumQuant[0 . . . 7] | N/A | Accumulation of quantizer scale values on each panel compressor |
| PanelBitCount[0 . . . 7] | N/A | Accumulation of number of bits generated on each panel compressor |
| AvgQuant | N/A | Average quantizer scale value of the frame just coded |
| SumPanelBitCount | N/A | Total number of bits generated by all panel compressors combined for the frame just coded. In RC sync, this is the number of bits generated so far for the frame. |
| K[I, P, B] | 0.75, 1.0, 0.75 | Weighting of I, P and B frames |
| X[I, P, B] | N/A | Estimate of the coding complexity |
| StartupX[I, P, B] | N/A | Start up value of the coding complexity estimate. |
| StartupQuant | N/A | Approximate minimum quantizer scale value to use for startup or scene change or fade in. |
| HeaderBitCount | N/A | Number of bits in the picture and/or sequence header(s) of the frame just encoded. |
| FrameBitCount | N/A | Total number of bits generated by the frame just encoded. |
| VideoBufferLevel | N/A | Number of bits stored in the physical video FIFO |
| EncoderBufferLevel | N/A | Total number of bits store in the encoder's buffers combined |
| BufferDelay | N/A | Total buffer delay of the encoder and decoder combined. |
| TargetBufferLevel | N/A | Approximate level of encoder buffer at the start of a new GOP |
| GopDuration | N/A | Estimate duration of the current GOP |
| PipelineSize | N/A | Number of frames in the encoder's current processing pipeline |
| PipelineRepeatFields | N/A | Number of repeated fields (3:2 pulldown) in the encoder's current processing pipeline. |
| PictureDuration | N/A | Estimated duration of the current frame. |
| β | 0.75 | GOP feedback factor |
| MaxJitter | 0.004 second | Maximum transport jitter in MPEG standard |
| FrameMaxDecoder | N/A | Maximum number of bits the current frame is allowed to generate, as constrained by decoder buffer. |
| FrameMaxEncoder | N/A | Maximum number of bits the current frame is allowed to generate, as constrained by encoder buffer. |
| VideoFifoSize | 125829 12 bits | Size of encoder's physical video FIFO |
| FrameMaxBits | N/A | Maximum number of bits the current frame is allowed to generate, as constrained by both encoder and decoder. |
| InitialFrameTargetBits | N/A | Target number of bits to be generated by the current frame, without feedback. |
| FrameTargetBits | N/A | Target number of bits to be generated by the current frame. |
| AllocationFactor[P, B] | N/A | Ratio of bit allocation to P and B frames. |
| PictureFeedback | N/A | Feedback of surplus of deficit of bits at picture level. |
| α | N/A | Picture feedback factor |
| AccumulatedFrameTargetBits | N/A | Accumulation of frame target bits since the beginning of the current GOP |
| FrameMinTarget | N/A | Minimum number of bits to generate to prevent the encoder video FIFO from emptying. |
| MaxTarget[I, P, B] | N/A | Maximum allowable value of FrameTargetBits |
| MinTarget[I, P, B] | N/A | Minimum allowable value of FrameTargetBits |
| FrameQuant | N/A | Target quantizer value for the frame |
| MinFrameQuant | 2 | Smallest target quantizer value for the frame |
| LastFrameQuant | N/A | Target quantizer value of the last coded frame of the same picture type |
| LastAvgQuant | N/A | Average of the actual quantizer scale of the last coded frame of the same picture type. |
| PartialFrameTargetBits | N/A | Portion of the FrameTargetBits as scaled by the number of macroblocks coded so far in the frame. |
| PartialFrameMaxBits | N/A | Portion of the FrameMaxBits as scaled by the number of macroblocks coded so far in the frame. |
| SumPanelMbCount | N/A | Number of macroblocks coded so far in the frame by all the panel compressors combined |
| CurrentQuant | N/A | The modified quantizer scale value currently being used. |
| MacroblocksPerFrame | N/A | Number of macroblocks in a frame. |
| MaxRcQuant | 144 | Maximum quantizer scale value without invoking panic mode. |

1. List of variables

| Name | Default Value | Description |
| --- | --- | --- |
| MaxQuantNonIntraDC Mul | N/A | DC entry of the non intra quantization muliplication table for quantizer scale value of 112. |
| PanicNonIntraDCMul | N/A | DC entry of the non intra panic table |
| PanicThreshold1, PanicThreshold2, PanicThreshold3 | {750000, 500000, 1500000} for P and B frames; {1500000, 1000000, 3000000} for I frame | Thresholds of FrameMaxBits for Panic mode. |
| LocalBufferSize | 345216 0 bits | Size of the panel compressor's local buffer |
| LocalBufferLevel | N/A | Fullness of the panel compressor's local buffer |
| PanelQuant | N/A | Actual quantizer scale value used by the panel compressor |

2. Initialization

1) Set all parameters to default values according to Table 1 and Table 2.

2) The Packet Processor sends the data packet from the video FIFO as soon as the first 184 bytes of the compressed data packet are written into the FIFO.

3. Configuration

The rate control task receives the following configuration parameters:

1. Elementary video stream bit rate (BitRate).
2. Nominal GOP length (N).
3. Temporal distance between every pair of I/P frames (M).
4. Video Format (1920×1080I or 1440×1080I or 1280×720P).
5. Video frame rate (29.97 Hz or 30 Hz or 59.94 Hz or 60 Hz).

4. MCC Picture Start Interrupt

A) Update Complexity Estimate from the Last Coded Frame

First, the frame bit count and average quantizer scales are calculated from the data read from the panel compressors. The bit count used in the complexity calculation is only for the slice layer bits. The bits generated for the headers, which are generated by the MCC, are not included.

AvgQuant=sum of PanelSumQuant over all 8 panels/ number of macroblocks per frame SumPanelBitCount=sum of PanelBitCount over all 8 panels These statistics are used to calculate the coding complexity of the previous coded picture as:

AvgQuant*SumPanelBitCount

It is assumed that the coding complexity for a particular picture type is relatively constant over a steady scene content, so that the complexity of a frame yet to be encoded may be estimated from the actual coding complexity of the most recently coded frames of the same picture type. Since I frames occur infrequently, only the most recently coded I frame is used as the complexity estimate (X[I]). As a compromise between stability and response speed, four most recently coded frames of the same picture type are used to generate the complexity estimate for P and B frames. It should be appreciated that averaging more frames provides a more stable complexity estimate but a slower response time. Likewise, averaging fewer frames provides a less stable complexity estimate but a faster response time.

The rate control algorithm maintains a queue to store the complexity values of the four most recently coded P frames, and a queue to store the complexity values of the four most recently coded B frames. The complexity estimate for P (or B) frame, X[P] (or X[B]), is then calculated as the average of the four complexity values stored in the P (or B) complexity queue.

The complexity estimates for I, P and B frames are used to calculate the target quantizer scale value and the bit budget for upcoming frames to be encoded. Details are described in the following sections.

Since the complexity estimates are computed from statistics generated from encoding the past frames, special handling is required at start up, scene change, or fade to reset the complexity estimate when the coding complexity from the past is not available or is not reliable.

At startup, the I complexity estimate and the P and B complexity queues are initialized to a set of default startup complexity values (StartupX[I/P/B]). If the current frame to be encoded is the first I or P frame after fade-in from black or scene change, the I complexity estimate and the values stored in the P and B complexity queues are conditionally replaced by the default startup value. Every stored value in the P and B complexity queue and the I complexity estimate, are compared with the startup complexity. The stored complexity is replaced by the startup complexity if the stored complexity is smaller.

If multiple scene changes occur within proximity to each other (e.g. flashes, special effects, or a bad edit), the complexity estimates are reset only once at the first scene change. This is achieved by skipping the reset if the complexity adjustment occurred in the previous P frame.

The default startup complexities are moderate complexity values calculated based on the assumption that an I frame consumes approximately 4 times as many bits as a P frame, and B frames consume approximately 20% fewer bits than P frames. This ratio of 4.0:1.0:0.8 is obtained from empirical observations. Other values of I:P:B ratios are possible. Furthermore, the startup complexities assume a provisional average quantizer scale value (StartupQuant) which varies linearly between 20 to 28 for bit rate values between 10 Mbps to 26 Mbps. This provisional average quantizer value is clamped at 20 for bit rate values lower than 10 Mbps, and at 28 for bit rate values higher than 26 Mbps.

The startup complexity values for I, P, and B frames are calculated as follows:

StartupX [I] = 4.0 * StartupQuant * N * (BitRate / FrameRate) / (4.0 + 1.0*Np + 0.8*Nb)
StartupX [P] = 1.0 * StartupQuant * N * (BitRate / FrameRate) / (4.0 + 1.0*Np + 0.8*Nb)
StartupX [B] = 0.8 * StartupQuant * N * (BitRate / FrameRate) / (4.0 + 1.0*Np + 0.8*Nb)

To accelerate the convergence of the P and B complexity estimate to the new scene, a state machine is implemented to handle the complexity update for the P and B frames following the complexity reset.

1. For the initial I or P frame after scene change (or fade-in from black), the complexity estimates are set to the reset value before the frame is encoded. After encoding the initial frame, the complexity estimates are updated using the new encoding complexity (AvgQuant*SumPanelBitCount). If the initial frame is an I frame, the I complexity estimate is updated. If the initial frame is a P frame, the entire P complexity queue is replaced by the new encoding complexity. The P encoding complexity is used to estimate the B encoding complexity, so the entire B complexity queue is replaced by the encoding complexity of the P frame multiplied by the value 0.8, which value is the estimated ratio of B complexity to P complexity. Other reasonable values can, of course, be used.
2. Because of reordering, the first group of B frames following the initial I or P frame may belong to the old scene. Therefore, if there is only one B frame in the group (M=2), the encoding complexity after encoding that B frame is discarded so that the B complexity queue stays at the reset value after that B frame is encoded. If there is more than one B frame in the first group of B frames (M=3), the encoding complexity of the first B frame is used as the complexity estimate for the next B frames in the group. Therefore, the B complexity queue is updated normally except for the last B frame in the group. After encoding the last B frame in the group, the B complexity queue is set to the reset value so that statistics possibly from the old scene will not contaminate the complexity estimates of the new scene.
3. If the initial frame is an I frame, after encoding the first P frame that follows the initial frame, the entire P complexity queue is replaced by the new encoding complexity. The B complexity queue is replaced by the encoding complexity of the P frame multiplied by a value such as 0.8, i.e., an estimated ratio of B complexity to P complexity. If the initial frame is a P frame, the complexity queue is updated normally after encoding the first P frame following the initial frame.
4. After encoding the first B frame in the second group of B frames following the initial frame, the entire B complexity queue is replaced by the new encoding complexity (AvgQuant*SumPanelBitCount) of the B frame.
5. The complexity queues are updated normally (by replacing the oldest entry by a new value) for every frame thereafter. For example, consider a scene change that occurs at frame I0 in the following sequence of frames (in encoding order): I0, B1, B2, P3, B4, B5, P6, . . . . Before encoding I0, the complexity estimates are forced to reset. The I complexity estimate is updated after encoding I0. The B complexity queue is set to the new encoding complexity after encoding B1. This new complexity estimate is used for encoding B2. After encoding B2, the B complexity queue is set to the reset value. After encoding P3, the entire P complexity queue is replaced by the encoding complexity of P3, and the entire B complexity queue is replaced by the same value multiplied by, e.g., 0.8. After encoding B4, the entire B complexity queue is replaced by the encoding complexity of B4. From B5 and P6 onward, the complexity queues are updated normally.

Consider a case where a fade-in from black happens at frame P0 in the following sequence of frames (in encoding order): P0, B1, B2, P3, B4, B5, P4, . . . . Before encoding P0, the complexity estimates (including I complexity) are forced to reset. After encoding P0, the P complexity queue is replaced by the encoding complexity of P0, and the B complexity queue is set to the same value multiplied by, e.g., 0.8. The B complexity queue is set to the new encoding complexity after encoding B1. This new complexity estimate is used for encoding B2. After encoding B2, the B complexity queue is set to the reset value. After encoding P3, both P and B complexity queues are updated in the same way as after encoding P0. After encoding B4, the entire B complexity queue is replaced by the encoding complexity of B4. From B5 and P6 onward, the complexity queues are updated normally.

A fade-out to black increases the complexity for P and B frames but decreases the complexity of I frames. Therefore, on the first frame when a fade-out is detected, a constant factor larger than one is multiplied with every entry of the B and P complexity queues to increase the complexity estimate. For example, the multiplier 1.25 can be used for P complexity and the multiplier 1.5 can be used for B complexity. The I complexity estimate is reduced by multiplying a constant factor less than one for every frame where fade-out is detected. The multiplier 0.975 can, for example, be applied on I complexity for every frame during a fade-out to black.

B) Update the Encoder's Buffer Status

Since the data transfer rate of the compressed data from the panel compressors' local buffers to the video FIFO via the PCI bus is much faster than the data output rate from the video FIFO, we can consider the combined video FIFO and the panel compressor's local buffers together as a single entity for the encoder's buffer level considerations. The level of the video FIFO is latched at Field Sync and is read by the MCC via the PCI bus interface.

First the total number of bits generated from the previous frame is calculated as follows:

FrameBitCount=SumPanelBitCount+HeaderBitCount

Then, the total encoder buffer level is computed as:

EncoderBufferLevel=VideoBufferLevel+FrameBitCount

A new GOP is set up if the current frame is an I frame. Before encoding an I frame, the MCC rate control algorithm calculates the bit budget for the new GOP, assuming a nominal number of frames for the GOP (N). The MCC rate control algorithm tries to bring the video buffer to a constant low level (TargetBufferLevel) at the start of every GOP. The TargetBufferLevel is set to be a fraction (one-eighth) of the usable buffer space in the encoder and decoder combined.

TargetBufferLevel=(BufferDelay*BitRate)/8 where BufferDelay is the total buffer delay which is detailed in section D below.

First, the MCC estimates the time duration of the upcoming GOP (GopDuration) based on the film mode status. The GOP is divided into two parts, namely, (i) the frames already preprocessed and waiting in the encoder's pipeline, and (ii) the future frames that have not yet entered the encoder's pipeline. For the frames that are already in the pipeline, the exact duration of the frames can be calculated from the number of frames in the pipeline (PipelineSize) and the number of frames that have a repeat field (PipelineRepeatFields). For the future frames that have not yet entered the pipeline, it is assumed that those frames have the same film mode classification as the most recently preprocessed frame, and the three-two pulldown pattern is continued if they are classified as film.

The current I frame is not included in the calculation of the PipelineSize and PipelineRepeatFields. However, the exact duration of the current frame (PictureDuration) is known from the repeat field status. If the current frame to be encoded has repeat first field, the PictureDuration equals (1.5/FrameRate), otherwise, PictureDuration equals (1.0/FrameRate). This process can be implemented using the following code:

```
if (most recently preprocessed frame is film){
    if ((N - 1 - PipelineSize) is even){
        GopInputFrames = PipelineSize + (0.5 *
PipelineRepeatFields) + 1.25 * (N - 1 - PipelineSize)
    } else {
        if (most recently preprocessed frame has repeat first field){
            GopInputFrames = 1.0 + PipelineSize +
(0.5 * PipelineRepeatFields) + 1.25 * (N - 2 - PipelineSize)
        } else {
            GopInputFrames = 1.5 + PipelineSize +
(0.5 * PipelineRepeatFields) + 1.25 * (N - 2 - PipelineSize)
        }
    }
}
GopDuration = PictureDuration + (GopInputFrames/InputFrameRate)
```

The target bit rate of the new GOP is the average number of bits transmitted during the GOP plus the surplus or deficit carried over from the previous GOP. This carry over is reflected by the deviation of the current buffer level from the target buffer level. In particular:

$$GOP\_target = (GopDuration*BitRate) + \beta*(TargetBufferLevel - EncoderBufferLevel)$$

where $\beta$ is an adaptive feedback control factor, such that $\beta=1.0$ when there are surplus bits carried over from the previous GOP (EncoderBufferLevel<TargetBufferLevel) and $\beta=0.75$ when there is a deficit (EncoderBufferLevel>TargetBufferLevel). This arrangement allows the rate control algorithm to respond quickly to make use of the unused bit (if any) left over from the previous GOP, yet avoids starving the new GOP if the previous GOP consumes more bits than the budget. Thus, any negative feedback is absorbed by the buffer and spread over future GOPs to avoid sudden degradation in the video quality. The GopTarget may be adjusted later during the GOP if the GOP size is extended to align the next I frame with a scene change, or if the film mode status changes.

C) Adjust the GopTarget

Within a GOP, the GOP target is adjusted every frame for the following:
  i) If a scene change is detected, the encoder may lengthen the GOP to align the next I frame with the scene change. In this case, the GopTarget is increased accordingly to provide the bits needs for coding the extra bits. This adjustment is only done on P frames, since extra B frames must be accompanied by P frames. If the current frame is film, the increment is (1.25*M*BitRate/FrameRate), otherwise the increment is (M*BitRate/FrameRate). The constant M is the distance (in frames) between two consecutive P frames.
  ii) When the initial target bit budget is calculated at the beginning of the GOP, it is assumed that the entire GOP will operate in film mode if the last preprocessed frame is film, or in regular video mode if the last preprocessed frame is non-film. However, the film mode status may change in the middle of a GOP.

If the most recently preprocessed frame belongs to the current GOP and switches from non-film to film, the GopTarget is increased accordingly to account for the expected increase in the expected duration of the GOP. The increase in GopTarget is calculated as:

$$0.25*(BitRate/FrameRate)*(\text{Number of unprocessed frames remaining in the GOP}),$$

where the number of unprocessed frames is calculated as:

$$N-(\text{Number of frames already encoded in the GOP}) - PipelineSize-1.$$

On the other hand, if the input switches from film to normal video, the GopTarget is decreased by the same amount to account for the expected decrease in the duration of the GOP. The film to video (or video to film) adjustment is skipped if the number of frames encoded so far in the GOP exceeds (N-PipelineSize-1).

D) Buffer Protection

The end-to-end buffer delay is set by the packet processor and is defined as the time elapsed from the time the first bit of the picture enters the encoder FIFO to the time the picture is pulled out from the decoder FIFO (Decoder Time Stamp (DTS) of the picture). The MCC rate control algorithm uses the delay value to calculate the maximum allowable number of bits in the picture that does not overflow the encoder buffer or underflow the decoder buffer. For high bit rates, the system stores as many bits as the decoder buffer allows to maximally utilize the buffers. For low bit rates, however, an upper bound of, e.g., one-half second delay is set to ensure a reasonable channel acquisition delay. For compliance with the ATSC standard, it is assumed that the decoder uses a 488*1024*16=7995392 bit buffer. The buffer delay is calculated from the following equation:

$$BufferDelay = Min\ (7995392\ bits/BitRate,\ 0.5\ second)$$

The delay is fixed at, e.g., 0.5 second for bit rates below 16 Mbps, and decreases linearly for bit rates above 16 Mbps, e.g. 0.2 second at 40 Mbps.

To prevent the decoder buffer from underflowing, all the bits currently in the encoder buffer plus the bits to be generated for the current frame have to be transported to the decoder before the decode time of the current frame. Since the PCI bandwidth is much higher than the output bit rate, we can assume that the transfer of data from the panel compressors to the video FIFO is instantaneous. The worst case decode time of the current frame is (BufferDelay-MaxJitter) time units after current picture is transferred to the video FIFO, which happens one picture processing time later.

If the encoder's current buffer level is higher than the nominal number of bits (BitRate*PictureDuration) to be transmitted from the encoder buffer to the decoder buffer during the current frame time, a constant output bit rate (BitRate) will be maintained. Otherwise, the packet processor will generate null packets to fill up the gap in the transport bandwidth, which effectively reduces the video bit rate. Therefore, the projected video FIFO level one frame time later when the current picture enters the video FIFO is:

$$\max\ (EncoderBufferLevel-(BitRate*PictureDuration), 0)$$

From the time the current frame enters the video FIFO to the decode time of the frame, worst case (BufferDelay-MaxJitter)*BitRate bits will be transported to the decoder FIFO so that the number of bits available for the current frame is:

FrameMaxDecoder=(BufferDelay−MaxJitter)*
BitRate−Max (EncoderBufferLevel−
(BitRate*PictureDuration), 0)

To prevent the encoder's video FIFO from overflow, the size of the current frame plus the level of the FIFO when the current frame is transferred to the video FIFO should not exceed the size of the video FIFO (VideoFifoSize), i.e.:

FrameMaxEncoder=VideoFifoSize−Max Encoder-
BufferLevel−(BitRate*PictureDuration), 0)

In an example implementation, the size of the video FIFO is 12582912 bits, although any other suitable FIFO size can be used as will be appreciated by those skilled in the art.

The maximum allowable bitstream size of the current frame is then calculated as the smaller of FrameMaxEncoder and FrameMaxDecoder. An offset of two transport packets' worth of video data (2*8*184=2944 bits) is included to provide a safety margin. Thus:

FrameMaxBits=MIN (FrameMaxEncoder,
FrameMaxDecoder)−2944

Since the packet processor inserts null packets to effectively reduce the video bandwidth when there is not enough data in the video FIFO, it is not necessary to set a lower bound on the frame size to protect the encoder or decoder buffer.

E) Calculate Bit Budget for the Frame

For every picture to be encoded, the MCC rate control algorithm calculates a target for the number of bits to be generated for the frame (FrameTargetBits). The basic idea is to distribute the available bits to the I, P, and B frames in proportion to the complexity estimates adjusted by a set of constant weighting factors (K[I], K[P], K[B]). The weighting factors (K[ ]) account for the different perceptual and statistical characteristics of I, P and B frames. As an example, the weighting factors (0.75, 1.0, 0.75) can be used, although other weighting factors are equally applicable. A portion of the deviation of the actual bits used from the target is fed back to adjust the target for the future frames.

For an I frame:

FrameTargetBits=GopTarget*K[I]*X[I] /(K[I]*X[I]+
Np*K[P]*X[P]+Nb*K[B]*X[B])

The smaller of FrameTargetBits value of the I frame and the actual number of bits generated by the I frame is then deducted from the GopTarget before allocating the remaining bits to the P and B frames. Note that if the actual number of bits generated exceeds the target, the target is deducted from the GopTarget instead of the actual bits because the I frame consumes bits at a much higher rate than P and B frames. Deviation of the I frame's bit consumption from the target may deplete the bit budget of the remaining P and B frames. By decoupling the actual I frame bits from the B and P bit allocation, the feedback is deferred to the next GOP.

For B and P frames, an allocation ratio is first calculated as follows:

AllocationFactor[P]=(N−1)/(Np+Nb*Max (½, Min (3,
(K[B]*X[B]/K[P]*X[P]))))

AllocationFactor[B]=(N−1)/(Nb+Np*Max (⅓, Min (2,
(K[P]*X[P]/K[B]*X[B]))))

The ratio of the weighting complexity (K*X) of P to B frames are bounded by ½ and 3 to avoid extreme allocation caused by an inaccurate complexity estimate. An initial frame target is then computed by applying the allocation factor to the average number of bits available to the P and B frames, as follows:

InitialFrameTargetBits=AllocationFactor*GopTarget/
(GopLength−1)

Note that GopLength is the current length of the GOP, which may be larger than NominalGopLength because the GOP is extended to align the next I frame with the scene change. If the current frame count with respect to the start of the GOP is less than the nominal GOP length (N), GopLength is set to the same value as N. If the current frame count exceeds N, GopLength is increased by M frames for every time a P frame is encountered. Feedback is then added to the InitialFrameTargetBits to compensate the deviation of the actual bit consumption from the target. The feedback is computed as:

PictureFeedback=*(AccumulatedFrameTargetBits−
GopBitCount)

AccumulatedFrameTargetBits is the accumulation of the FrameTargetBits since the beginning of the GOP. The PictureFeedback portion of the FrameTargetBits is excluded in the accumulation in every P and B frame. GopBitCount is the number of bits generated by the current GOP up to and including the last coded frame.

After encoding each frame, the GopBitCount is increased by the effective number of bits generated by the frame. Since the null packet is inserted to sustain the transport bit rate when the video FIFO level is lower than that required to produce one transport packet, the effective number of bits produced for the last coded frame is lower bounded by the number of bits that are required to sustain a constant output bit rate during the upcoming frame time minus the number of bits that are already in the video FIFO. The effective number of bits generated is:

Max (FrameBitCount, (PictureDuration*BitRate−
VideoBufferLevel)

The constant α controls the response of the system. If α is too big, the system becomes unstable; if α is too small, the response is slow. In an example embodiment, α can be set to 1/N, although other values can be substituted.

To avoid excessive negative feedback that may deplete the bit budget of the current frame, the magnitude of PictureFeedback is bounded to not exceed one-third of the InitialFrameTargetBits if the feedback is negative.

FrameTargetBits=InitialFrameTargetBits+PictureFeedback

Finally, the FrameTargetBits is bounded both from above and below. It is necessary that the FrameTargetBits does not lie in the proximity of the maximum allowable number of bits that applies for buffer protection. Otherwise, panic mode may be invoked too early and the picture quality will be excessively degraded. Although it is not necessary to set a minimum picture size to protect the buffer, it is desirable that the encoded frame is big enough such that bandwidth would not be wasted by sending null packets. Therefore, a minimum value for the FrameTargetBits is calculated as the worst case number of bits required to prevent the encoder video FIFO from emptying.

FrameMinTarget=(1.5*BitRate/FrameRate)−Max (En-
coderBufferLevel−(BitRate*PictureDuration), 0)

To avoid extreme values that may result from inaccurate complexity estimates, hard limits are provided so that the FrameTargetBits will not exceed the upper limit or fall below this limit.

FrameTargetBits=Min (FrameTargetBits, 0.8*FrameMaxBits, MaxTarget)

FrameTargetBits=Max (FrameTargetBits, FrameMinTarget, MinTarget)

The value of MaxTarget and MinTarget are defined as:

MaxTarget [I frame]=GopTarget−(N−1)*(Number of Macroblocks per frame)*8

MaxTarget [P or B frame]=GopTarget/N

MinTarget [I frame]=GopTarget/N

MinTarget [P or B frame]=(Number of Macroblocks per frame)*8

F) Determine the Target Quantizer Scale for the Frame.

The target quantizer scale is calculated from the target frame bit rate and the complexity estimate, lower bounded to prevent incorrect complexity estimates from driving the quantizer scale too low. The quantizer scale is also upper bounded by the maximum MPEG nonlinear quantizer scale value.

FrameQuant=Max (MinFrameQuant, X[picture_type] /FrameTargetBits)

The value MinFrameQuant is set to 2.

To improve stability in case of inaccurate complexity estimates, especially in complex still images, the algorithm sets a lower bound for the target quantizer value of P and B frames if it drops suddenly from a relatively higher value. The following adjustments are made to FrameQuant if FrameQuant is smaller than the last AvgQuant value of the same picture type and smaller than 24:

FrameQuant=Min (StartupQuant, (FrameQuant+Max (LastFrameQuant, LastAvgQuant))/2 where LastFrameQuant is the target quantizer (FrameQuant) value of the most recently coded frame of the same picture type, and LastAvgQuant is the actual average quantizer (AvgQuant) value of the most recently coded frame of the same picture type.

The target quantizer scale (FrameQuant) value calculated on the MCC is then clamped by a maximum value and delivered to the panel compressors to be used initially to code the panels. Details for setting the upper bound and the quantization strategy on the panel compressors are provided hereinafter. The quantizer scale values are adjusted periodically at RC sync interrupts by a feedback process to drive the actual number of bits generated in the picture towards the target.

G) Delay Start of a New GOP if Buffer Level is too High

Before a new GOP may be started, the algorithm makes sure that there is enough room in the buffer to accommodate the surge of bits to be generated by the upcoming I frame. Since the rate control task is carried out after the decision of picture coding type, the buffer is inspected to determine the feasibility of starting a new GOP at the next frame. If there is not enough space in the buffer, the rate control task sends a signal to prevent the next frame from starting a new GOP. The next frame is allowed to start a new GOP if:

EncoderBufferLevel+FrameTargetBits− (PictureDuration*BitRate)

is below a threshold which is precomputed as:

Min (0.5*BufferDelay*BitRate, TargetBufferLevel+ (0.333*N*BitRate/FrameRate)

5. MCC RC Sync Interrupt

Ideally, the frame target quantizer scale (FrameQuant) should be used throughout the picture to produce a uniform quality over the entire picture. However, the rate control model based on the frame complexity estimate is not always accurate. Thus, adjustments to FrameQuant are necessary to control the bit rate. A feedback mechanism is used such that the accumulated bit count of the frame is compared to the target bit rate of the frame, scaled by the portion of macroblocks coded.

At RC Sync interrupt, the MCC reads two parameters from every panel compressor. These parameters are (i) the number of macroblocks currently encoded, and (ii) the number of bits generated so far. The MCC sums up these statistics for all eight panels (SumPanelBitCount and SumPanelMbCount). The MCC then computes a partial target and a partial maximum for the number of bits generated.

PartialFrameTargetBits=FrameTargetBits* SumPanelMbCount/(Number of macroblocks per frame)

PartialFrameMaxBits=FrameMaxBits* SumPanelMbCount/(Number of macroblocks per frame)

The adjustment of the quantizer scale is based on the ratios of the SumPanelBitCount to PartialFrameTargetBits and to PartialFrameMaxBits. If the bit count (SumPanelBitCount) exceeds 0.9 of PartialFrameMaxBits, the quantizer scale is adjusted as:

CurrentQuant=CurrentQuant*0.9*SumPanelBitCount/ PartialFrameMaxBits where CurrentQuant is the current quantizer scale being used, which is initialized to the value FrameQuant at the start of encoding the frame. Otherwise the adjustment is based on the ratio of SumPanelBitCount to PartialFrameTargetBits using the following piecewise linear model:

| | |
|---|---|
| ratio < 1.5 | CurrentQuant = FrameQuant |
| 2.0 ≥ ratio > 1.5 | CurrentQuant = (1 + 0.5 * (ratio − 1.5)) * Max (FrameQuant, CurrentQuant) |
| ratio ≥ 2.0 | CurrentQuant = 1.25 + (ratio − 2.0) * Max (FrameQuant, CurrentQuant) |

Assuming that the bit count at the end of each frame is close to the target bit rate, the final quantizer scale value of the panel would be close to the initial value which is FrameQuant. Such arrangement avoids visible seams at panel boundaries that can be caused by abrupt changes in the quantizer scale.

To improve stability, the value of CurrentQuant calculated in the current RC sync is then averaged with the value of CurrentQuant calculated in the previous RC sync.

The value of CurrentQuant is then capped to the same upper bound as that used to cap FrameQuant (detailed hereinafter), and averaged with the previous CurrentQuant value. Before sending the final value of quantizer scale to the panel compressors, CurrentQuant is further adjusted to increase the quantizer scale value to protect the buffers if the SumPanelBitCount is approaching the limit of FrameMaxBits:

```
if (SumPanelBitcount>0.975*FrameMaxBits)
    CurrentQuant=512 else if (SumpanelBitCount>0.95*FrameMaxBits)
    AND (SumPanelMbCount<0.8*
    MacroblocksPerFrame))
    CurrentQuant=4*CurrentQuant else if (sumpanelBitcount>0.9*FrameMaxBits) AND
    (SumPanelMbCount<0.7*MacroblocksPerFrame))
    CurrentQuant=2*CurrentQuant
```

Finally, the value of CurrentQuant is capped again by the same upper bound as that used to cap FrameQuant. A lower bound of 2 also applies to CurrentQuant.

6. Quantization Strategy

The panel compressors perform quantization by multiplying the DCT coefficients with precomputed sets of reciprocal values of the quantizers. There are 32 precomputed sets of multipliers on the panel compressors. The first 31 tables correspond to the MPEG quantizer scale index of 1 to 31, which are mapped to the quantizer scale value of 1 to 112 according to the MPEG nonlinear quantizer mapping table. The $32^{nd}$ table is reserved for a panic mode in which all multipliers are set to zero, except for the intra DC, so that the DCT coefficients may be discarded to minimize the number of bits generated. This panic mode should be invoked only as an emergency measure to protect the buffers. The DC value of the non-intra panic multiplier table (PanicNonIntraDCMul) may be written by the MCC to determine whether to normally quantize the non-intra DC by the maximum MPEG quantizer scale (112), or set it to a fraction of the normally quantized value. If the panel compressor receives from the MCC a quantizer scale value (PanelQuant) between 1 to 112, the normal tables are selected. For any PanelQuant value above 112, the panic table will be selected.

The quantization scale value calculated by the MCC (FrameQuant or CurrentQuant) spans a range of 1 to 512. This value is converted to an 8-bit value from 1 to 255 (PanelQuant) to be sent to the panel compressor to select the multiplier table, and is also used to determine the non-intra DC multiplier of the panel compressor's panic table:

| | |
|---|---|
| 1 <= CurrentQuant <= 112: | PanelQuant = round currentQuant to the nearest integer by truncation. PanicNonIntraDCMul = MaxQuantNonIntraDCMul |
| 112 < CurrentQuant <= MaxRcQuant: | PanelQuant = 112; PanicNonIntraDCMul = MaxQuantNonIntraDCMul |
| MaxRcQuant < CurrentQuant < 512: | PanelQuant = 255; PanicNonIntraDCMul = MaxQuantNonIntraDCMul |
| CurrentQuant = 512: | PanelQuant = 255; PanicNonIntraDCMul = 0.3 * MaxQuantNonIntraDCMul | where MaxQuantNonIntraDCMul is the non-intra DC entry of the multiplier table for the maximum MPEG quantizer scale (112). MaxRcQuant is a constant value current set to 144.

Normally, the FrameQuant value should not be allowed to exceed MaxRcQuant above which the panel compressor may invoke panic mode that severely degrade the picture quality. However, if the encoder buffer is at the verge of overflowing, or if the decoder buffer is at the verge of undeflowing, the panel compressors should be allowed to go into panic mode at the onset of encoding the frame. Therefore, the following adaptive algorithm is used to set the upper bound of FrameQuant base on the value of FrameMaxBits. If FrameMaxBits is big enough to support the worst case number of bits generated by normal MPEG quantization (FrameMaxBits exceeds a thresholdPanicThreshold1), FrameQuant is capped by MaxRcQuant to avoid going into panic mode.

Once FrameMaxBits goes below PanicThreshold1, the upper bound is changed, e.g., to 176, which enables panic mode on the panel compressors but preserves the non-intra DC coefficient at panic. If the FrameMaxBits further drops below a second threshold PanicThreshold2, the upper bound is set to 512 so that the quantized value of the non-intra DC coefficient can be reduced beyond that of normal quantization. A hysteresis mechanism is provided so that once the upper bound is raised above MaxRcQuant, it will not return to MaxRcQuant until FrameMaxBits exceeds a third threshold (PanicThreshold3). The thresholds {PanicThreshold1, PanicThreshold2, PanicThreshold3} can be set, for example, to the values {750000, 500000, 1500000} for P and B frames, and {1500000, 1000000, 3000000} for I frames.

7. Panel Compressors

Each panel compressor receives the PanelQuant value from the MCC at every RC Sync and at picture start. The panel compressors then perform the following routine on a macroblock by macroblock basis:

A) Update the encoding statistics.

Accumulate the macroblock count, PanelSumQuant (sum of actual quantizer scale used), and PanelBitCount (number of bits generated so far in the panel). These statistics are reset to zero at the beginning of the frame.

B) Check fullness of local buffer; ramp up the quantizer scale if the local buffer level is approaching full.

```
if (LocalBufferLevel<(112/128)*LocalBufferSize)
    PanelQuant unchanged else if (LocalBufferLevel<(120/128)*LocalBuffer-
    Size) PanelQuant=4*PanelQuant else if (LocalBufferLevel<(124/128)*LocalBufferSize
    PanelQuant=16*PanelQuant else PanelQuant=255
```

C) Modulate PanelQuant by adaptive quantization the same way as in MPEG Test Model 5.

D) Apply the final quantizer scale to perform quantization.

8. Packet Processor

Whenever the video FIFO has at least one transport packet payload's worth of data (184 bytes), the packet processor retrieves the data from the primary video FIFO at an average data rate equal to the video bit rate (bit_rate) as specified by the user. Whenever the FIFO level falls below 184 bytes, the packet processor will stop retrieving data from the FIFO to protect the FIFO from underflow. Null packets will then be substituted for video packets to maintain a constant transport bit rate.

It should now be appreciated that the present invention provides a rate control algorithm for optimizing the performance of a video encoder that utilizes multiple parallel compression engines. The invention has application to both HDTV and SDTV encoders.

Although the invention has been described in connection with various preferred embodiments, it should be appreciated that numerous adaptations and modifications thereof can be provided without departing from the scope of the invention as set forth in the claims.

What is claimed is:

1. A method for controlling the quantization in a digital video encoder that comprises a plurality of parallel compression engines, comprising the steps of:
   determining a target quantization level for a video frame;
   wherein the video frame is represented by a plurality of panels, each panel comprises a plurality of slices, and each panel is processed in parallel by a respective one of the compression engines;
   encoding the first slice of each panel in accordance with said target quantization level; and
   encoding subsequent slices in each panel in accordance with a quantization level that is allowed to vary from said target quantization level until the last slice of each panel is reached;
   wherein the quantization level used for encoding the last slice of each panel is driven toward said target quantization level.

2. A method in accordance with claim 1 wherein said driving step uses piecewise linear feedback to drive the quantization level of the last slice of each of said image panels toward said target quantization level.

3. A method in accordance with claim 2 wherein said feedback avoids abrupt variations in the quantization level between the first and last slice of each of said image panels.

4. A method in accordance with claim 1 wherein a group of pictures (GOP) target bit rate is adjusted based on a number of film pictures and non-film pictures currently in a processing pipeline of at least one of said compression engines.

5. A method in accordance with claim 4 wherein a higher target bit rate is provided for non-film pictures.

6. A method in accordance with claim 1, wherein:
   the quantization level used for encoding the last slice of each panel is driven toward said target quantization level such that the first slice and the last slice of each panel are encoded in accordance with approximately the same quantization level.

7. A method in accordance with claim 1 wherein a buffer level of said video encoder is used to control the start of a new group of pictures (GOP).

8. A method in accordance with claim 1 wherein said panels are simultaneously compressed at the respective compression engines during a frame time.

9. A method in accordance with claim 8 wherein the compressed panel data are stored locally at the compression engines for subsequent transfer to a video buffer of the video encoder within a next frame time.

10. A method in accordance with claim 9 wherein data are retrieved from said buffer, to form a transport packet, at an average rate equal to a specified video bit rate whenever the buffer has at least one transport packet payload's worth of data.

11. A method in accordance with claim 10 wherein null packets are substituted for video packets to maintain a constant transport bit rate whenever said buffer level falls below one transport packet payload's worth of data.

12. A method in accordance with claim 7 wherein a reference quantizer scale is calculated for each of said compression engines.

13. A method in accordance with claim 12 wherein the reference quantizer scale for a compression engine is calculated based on:
   the target quantization level,
   an accumulation of quantizer scale values for each compression engine (sum_quant),
   an accumulation of the number of bits generated on each compression engine (bitcount);
   an accumulation of the number of macroblocks processed on each compression engine (MBcount); and
   a fullness level of a video buffer of the video encoder (buffer_level).

14. A method in accordance with claim 13 wherein the compression engine modifies its reference quantizer scale based on a local buffer fullness to generate a final quantizer scale value for use in quantization.

15. A method in accordance with claim 14 wherein a panic mode is initiated by the compression engine if the final quantizer scale value is higher than a predetermined maximum value, said panic mode maintaining the quantization at or below said predetermined maximum value.

16. Apparatus for controlling the quantization in a digital video encoder that comprises a plurality of parallel compression engines, comprising:
   means for determining a target quantization level for a video frame;
   wherein the video frame is represented by a plurality of panels, each panel comprises a plurality of slices, and each panel is processed in parallel by a respective one of the compression engines;
   means for encoding the first slice of each panel in accordance with said target quantization level; and
   means for encoding subsequent slices in each panel in accordance with a quantization level that is allowed to vary from said target quantization level until the last slice of each panel is reached; and
   means for driving the quantization level at the last slice of each of said image panels toward said target quantization level.

17. A method in accordance with claim 1, further comprising:
   computing said target quantization level based on a complexity estimates from a number of past frames, wherein:
   a complexity value of the most recently encoded I-frame is used as the complexity estimate for a current I-frame;
   an average of the complexity values of the four most recently encoded P-frames are used as the complexity estimate for a current P-frame; and
   an average of the complexity values of the four most recently encoded B-frames are used as the complexity estimate for a current B-frame.

18. A method in accordance with claim 17, wherein:
   a P complexity queue stores the complexity values of the four most recently encoded P-frames; and
   a B complexity queue stores the complexity values of the four most recently encoded B-frames.

19. A method in accordance with claim 18, wherein:
   in the event that the current frame to be encoded is a first I-frame or P-frame after one of a scene change or a fade-in from black, the I-frame complexity estimate and the complexity values stored in the P and B complexity queues are conditionally replaced by corresponding I, P, and B default startup complexity estimates.

20. A method in accordance with claim 18, further comprising:
comparing the stored values in the P and B complexity queues and the I complexity estimate with the corresponding I, P, or B default startup complexity value;
replacing the stored complexity value with the corresponding P and B default startup complexity value in the event that the stored complexity value is less than the corresponding default startup complexity value;
replacing the I complexity estimate with the corresponding I default startup complexity value in the event that the I complexity estimate is less than the corresponding default startup complexity value.

21. A method in accordance with claim 18, further providing:
multiplying the stored complexity values of the P and B complexity queues with a constant greater than 1 in order to increase the P and B complexity estimates where the current frame is a first frame after a fade-out to black has been detected;
multiplying the I complexity estimate by a constant less than 1 in order to reduce the I complexity estimate for every I frame during a fade-out to black.

22. A method in accordance with claim 9, wherein:
the encoder buffer is a central buffer for the video encoder; and
the buffer fullness level of the video encoder is provided by the sum of the levels of the encoder buffer and levels of local buffers at each compression engine.

23. A method in accordance with claim 22, further comprising:
setting a target buffer fullness level at the start of every GOP.

24. A method in accordance with claim 23, wherein:
the buffer fullness level is driven to the target buffer fullness level using feedback control at the start of every GOP.

25. A method in accordance with claim 17, further comprising:
determining a target number of bits to be generated during encoding of each group of pictures (GopTarget);
determining a target number of bits to be generated during encoding of each frame (FrameTargetBits); and
allocating the GopTarget bits among each frame in the group of pictures in proportion to the complexity estimates for each frame.

26. A method in accordance with claim 25, further comprising:
scaling the complexity estimates for each frame by a corresponding weighting factor to account for different perceptual and statistical characteristics between I, P, and B frames.

27. A method in accordance with claim 25, further comprising:
bounding the FrameTargetBits to a fraction of a maximum allowable number of bits for the frame to avoid panic mode.

28. A method in accordance with claim 1, further comprising:
setting a lower bound for the target quantization level for P and B frames if the quantization level for the current P or B frame is lower than a previous quantization level for a corresponding P or B frame.

29. A method in accordance with claim 1, further comprising:
delaying the encoding of a new Group of Pictures (GOP) if there is insufficient space in an encoder buffer to accommodate an I frame.

30. A method in accordance with claim 1, further comprising:
determining a maximum number of bits encoding of the current frame is allowed to generate (FrameMaxBits);
initiating a panic mode in the event that FrameMaxBits falls below a threshold, said panic mode allowing a graceful degradation in video quality.

31. A method in accordance with claim 30, wherein:
in the event that FrameMaxBits falls below a first threshold, non-intra DC coefficients are preserved during panic mode encoding, while all other DCT coefficients are dropped.

32. A method in accordance with claim 31, wherein:
in the event that FrameMaxBits falls below a second threshold which is lower than said first threshold, the magnitude of the non-intra DC coefficients is scaled to reduce the magnitude of the non-intra DC coefficients.

33. A method in accordance with claim 32, wherein:
in the event that FrameMaxBits falls below a third threshold which is lower than said second threshold, all DCT coefficients are dropped, including non-intra DC coefficients.

* * * * *